United States Patent [19]

Yamada et al.

[11] Patent Number: 4,727,419
[45] Date of Patent: Feb. 23, 1988

[54] METHOD AND APPARATUS FOR DETECTING TIRE INFORMATION MARK

[75] Inventors: Kouji Yamada; Yoshio Marumoto; Tetsuo Mizuno, all of Kodaira, Japan

[73] Assignee: Bridgestone Corporation, Tokyo, Japan

[21] Appl. No.: 848,099

[22] Filed: Apr. 4, 1986

[30] Foreign Application Priority Data

Apr. 4, 1985 [JP] Japan .................. 60-69907

[51] Int. Cl.⁴ .............................................. H06N 7/18
[52] U.S. Cl. ........................................ 358/101; 358/93; 382/8
[58] Field of Search ............... 382/8; 358/101, 93; 152/523

[56] References Cited

U.S. PATENT DOCUMENTS

| | | | |
|---|---|---|---|
| 3,225,810 | 12/1965 | Enabnit | 382/8 |
| 3,781,798 | 12/1973 | Hinks | 382/8 |
| 3,801,957 | 4/1974 | Hogan | 382/8 |
| 3,810,159 | 5/1974 | Hinks | 382/8 |
| 3,930,141 | 12/1975 | Koyama et al. | 382/8 |

FOREIGN PATENT DOCUMENTS

| | | | |
|---|---|---|---|
| 3141461 | 6/1982 | Fed. Rep. of Germany | 152/523 |
| 3333149 | 3/1985 | Fed. Rep. of Germany | 152/523 |

*Primary Examiner*—Howard W. Britton
*Assistant Examiner*—John K. Peng
*Attorney, Agent, or Firm*—Sughrue, Mion, Zinn, Macpeack & Seas

[57] ABSTRACT

In case of detecting tire information marks engraved in a side wall portion of tire in the form of protrusion or recess, width and inner diameter of tire are detected to provide a tire size signal, after a first camera head is driven into a given position in accordance with the tire side signal, an identification mark engraved in the size wall portion of tire is optically detected by the first camera head to derive a position signal, and after a second camera head is driven into a given position in accordance with the position signal, the tire information marks are optically detected by the second camera head to derive a tire information signal. In this manner, the tire information marks can be detected in a rapid and accurate manner.

17 Claims, 11 Drawing Figures

METHOD AND APPARATUS FOR DETECTING TIRE INFORMATION MARK

BACKGROUND OF THE INVENTION

Field of the Invention and Related Art Statement

The present invention generally relates to a technique for detecting automatically characters, numerals and marks engraved in a side wall portion of a tire to derive tire information such as kind, size and shape of tire.

Heretofore, in order to classify or identify various tires, and operator visually reads characters, numerals and marks provided on side wall portions of tires in the form of protrusion or recesses. Hereinafter, these characters, numerals and marks are called tire information marks. Moreover, various methods for detecting automatically the tire information marks have been proposed. In one method, a side wall portion of tire is illuminated and is optically picked-up by a camera head including imaging lens and image sensor, while the tire and camera head are rotated relative to each other a constant speed.

In case of optically detecting the tire information marks engraved on the side wall portion of tire, it is very difficult to extract only the desired tire information marks, because there are formed on the side wall portion of tire various characters and marks other than the tire information marks and these undesired characters and marks might cause noise. It should be noted that a position of the tire information marks on a tire viewed in a radial direction differs for various kinds of tires and a height of the side wall portion is also varied in accordance with the width of a tire. Moreover, since the tire information marks have the same color as that of the background, an image of the side wall portion projected upon the image sensor has a very low contrast. Therefore, a photoelectrically converted signal has a very small signal-to-noise ratio.

Due to the above explained severe conditions, in the known method, the detection of the tire information marks requires a very long time period, longer than ten seconds. This results in a serious drawback of the known detecting method. That is to say, the known method could not be applied to the tire manufacturing line on which tires are fed at a period of two or three seconds. In such a case there must be provided a plurality of tire information mark detecting sections arranged in parallel with each other. This apparently results in undesired increase in cost and space.

SUMMARY OF THE INVENTION

The present invention has for its object to provide a novel and useful method and apparatus for detecting tire information in a rapid and accurate manner.

It is another object of the invention to provide an apparatus for optically detecting the tire information marks in a rapid and accurate manner, which apparatus can be preferably applied to the tire manufacturing line.

It is still another object of the invention to provide a tire whose tire information marks can be optically detected in a rapid and accurate manner.

According to a first aspect of the invention, a method of detecting tire information marks provided on a side wall portion of a tire in the form of protrusion or recess comprises the steps of:

detecting an identification mark provided on the side wall portion of tire at a given position with respect to the tire information marks to derive a position signal;

positioning a detector head for detecting the tire information marks on the side wall portion of tire in accordance with said position signal; and detecting the tire information marks by means of the detector head.

In a preferred embodiment of the tire information detecting method according to the invention, prior to the detection of the identification mark, width and inner diameter of tire are detected to derive a tire size signal, and a detector head for detecting the identification mark is positioned with respect to the tire in accordance with the detected tire size signal.

According to a second aspect of the invention, an apparatus for optically detecting tire information marks formed on a side wall portion of tire in the form of protrusion or recess, comprises means for detecting width and inner diameter of tire to derive a tire size signal;

first detecting means comprising a detector for detecting an identification mark provided on the side wall portion of tire at a given position with respect to the tire information marks, and means for positioning said detector in accordance with the tire size signal and for rotating relatively the detector and tire to derive a position signal; and second detecting means comprising a camera head for picking up the tire information marks and means for positioning the camera head in accordance with the position signal.

In a preferred embodiment of the tire information detecting apparatus according to the invention, said detector of the first detecting means is formed by a camera head for picking up the identification mark engraved in the side wall portion of tire in the form of protrusion or recess.

According to a third aspect of the invention, a tire for use in a vehicle comprises a main body including bead portion, side wall portion and tread portion, tire information marks engraved in the side wall portion in the form of protrusion or recess, and an identification mark engraved in the side wall portion in the form of protrusion or recess at a given position with respect to the tire information marks.

In a preferred embodiment of the tire according to the invention, said identification and tire information marks are formed by protrusions having a triangular cross section whose apex angle is set to 40°–140°, preferably 55°–110°, whose height is set to 0.4–1.4 mm, preferably 0.4–0.8 mm, and whose base width is set to 0.4–1.0 mm, preferably 0.4–0.8 mm.

In general, the tire information marks are formed on the side wall portion of tire in the form of protrusion or recess by providing a corresponding stencil plate within a vulcanizing mold. According to the invention, the identification mark may be formed in the same manner as that for forming the tire information marks. That is to say, a stencil plate corresponding to the identification mark such as identification bar code may be provided within the vulcanizing mold at a predetermined position with respect to the stencil plate for forming the tire information marks. In such a case, the identification mark is detected also optically by means of an optical head. Since the identification mark may be formed by a special mark as a bar code which is not necessarily understood by the operator, the identification mark can be easily and rapidly detected by means of the optical head having a simple construction. Further, since the optical head for reading out the tire information marks is indexed at a desired position in accordance with the position signal, the tire information marks can be detected rapidly and accurately without being affected by other characters and marks formed on the side wall portion.

DESCRIPTION OF THE PREFERRED EMBODIMENTS

Figure 1:
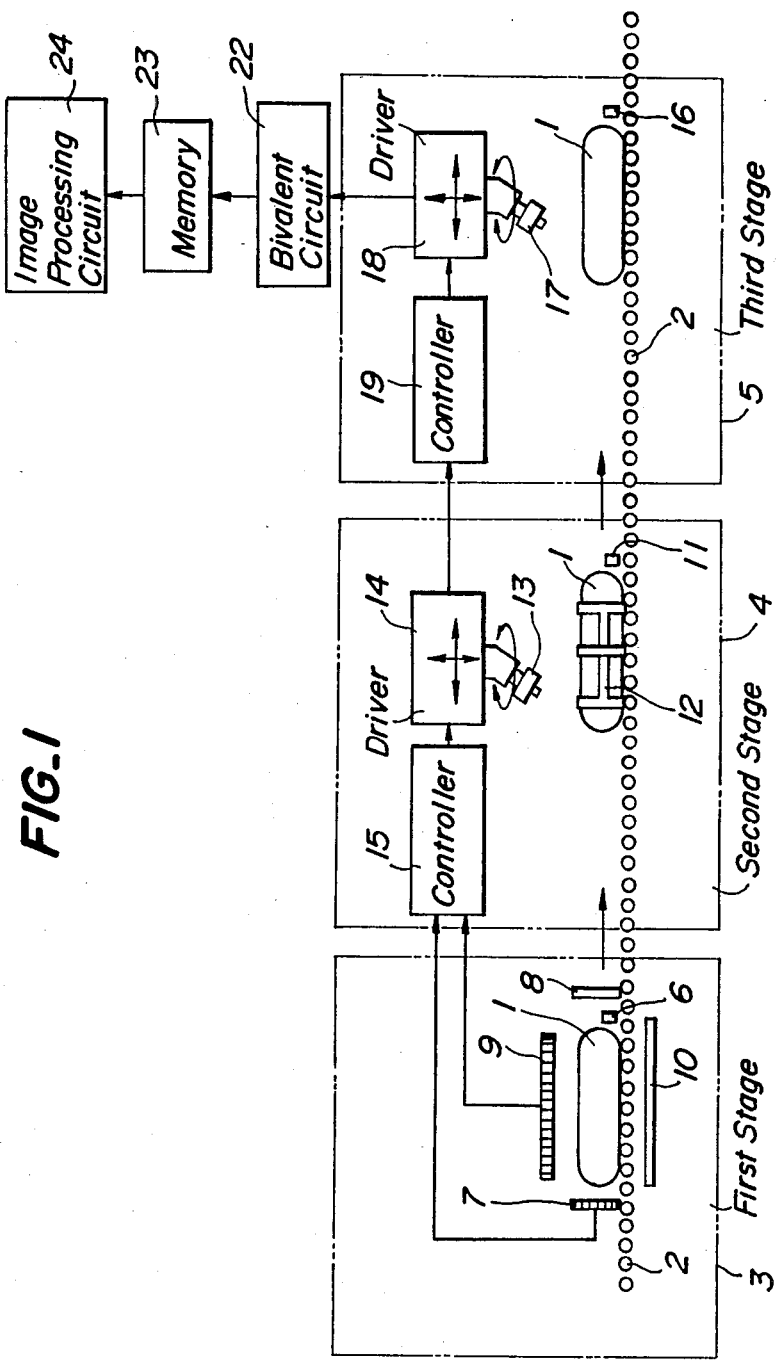
FIG. 1 is a schematic view showing an embodiment of the tire information detecting apparatus according to the invention.

FIG. 1 is a schematic view showing a construction of the apparatus for detecting tire information marks according to the invention. The apparatus generally comprises three stages and a tire 1 to be identified is fed through the three stages successively along a roller conveyer 2. At a first stage 3, width and inner diameter of tire are detected to derive a tire size signal. A second stage 4 comprises a first optical head for detecting an identification mark formed on a side wall portion of tire. The first optical head is driven into a given position with respect to the tire in accordance with the tire size signal supplied from the first stage 3. A third stage 5 includes a second optical head for detecting the tire information marks formed on the side wall portion of tire to derive a position signal. The second optical head is driven into a given position with respect to the tire in accordance with the position signal.

The first stage 3 comprises tire arrival detection sensor 6, tire width detection sensor 7, tire width detection light projector 8, tire inner diameter detection sensor 9 and tire inner diameter detection light projector 10. The tire width detection sensor 7 and light projector 8 are diametrically opposed to each other with respect to the tire 1. The tire inner diameter detection sensor 9 and light projector 10 are arranged above and below the tire 1, respectively. The tire width detection sensor 7 and tire inner diameter detection sensor 9 are formed by a linear image sensor such as phototransistor array and CCD line sensor. The light projectors 8 and 10 are constructed so that they can emit parallel light fluxes in directions perpendicular to and parallel with an axis of tire, respectively.

The second stage 4 comprises a tire arrival detection sensor 11, centering device 12 for positioning the tire 1 in such a manner that the axis of tire is aligned with a predetermined axis of the optical head. A camera head 13 is used for detecting the identification mark formed on the side wall portion of tire. A camera head driver 14 moves the camera head 13 in a width direction of tire as well as in a radial direction of tire. A controller 15 controls the camera head driver 14 in accordance with the tire size signal supplied from the sensors 7 and 9 of the first stage 3.

Figure 2A:
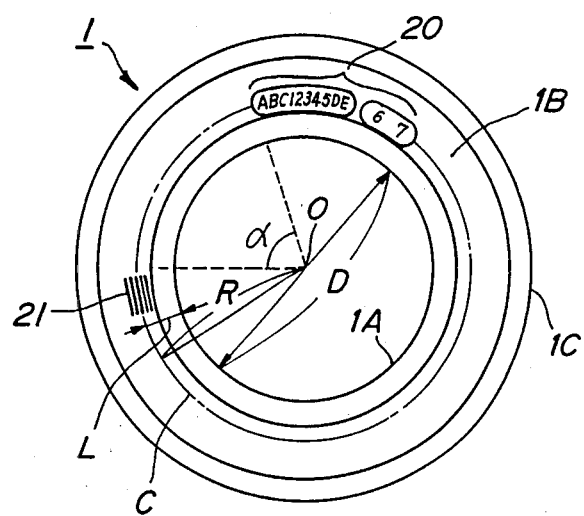
FIGS. 2A and 2B are plan views showing the tire information marks provided on the side wall portion of tire.
Figure 2B:
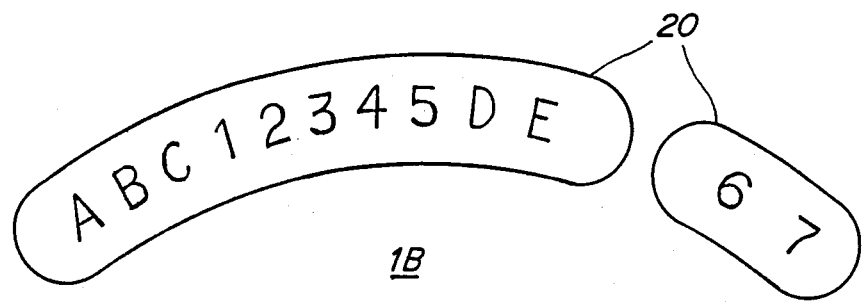

FIG. 2A is a plan view showing an embodiment of the tire according to the invention and FIG. 2B is an enlarged plan view illustrating an embodiment of the tire information marks provided on the side wall portion of tire. The tire 1 generally comprises a main body including a bead portion 1A defining an inner diameter D of the tire 1, a side wall portion 1B and a tread portion 1C. The tire further comprises a tire information marks 20 engraved in the side wall portion 1B as characters and numerals in the form of protrusion or recess, and an identification mark 21 also engraved in the side wall portion 1B in the form of protrusion or recess. It should be noted that the tire information marks 20 and identification mark 21 are formed at predetermined positions on the side wall portion 1B. That is to say, a radius R of a circle C passing through a center of the identification mark 21 or a distance L between a periphery of the bead portion 1A and the circle C is set to a predetermined value. A center angle $\alpha$ between a trailing edge of the identification mark 21 and a front edge of the tire information marks 20 viewed in the clockwise direction in FIG. 2A is set to a predetermined value. The radius R or distance L and angle $\alpha$ are suitably set in accordance with configuration of respective tires, and thus their positions can be determined by detecting the width and inner diameter. It should be noted that in the present embodiment the tire information marks 20 and identification mark 21 are formed on the same circle C, but they may be provided on different circles. In such a case a distance between these circles has to be predetermined.

After the camera head 13 of the second stage 4 has been set into a given position by driving the camera head 13 in the tire width and radial directions in accordance with the tire size signal, the camera head 13 is rotated about the tire axis O (FIG. 2A) to scan optically the side wall portion 1B of tire 1 along the circle C. In this manner, the identification mark 21 on the side wall portion 1B is optically detected.

The third stage 5 includes a tire arrival detection sensor 16, a second camera head 17, a camera head driver 18 and a camera head driver controller 19. The second camera head 17 is arranged movably in tire width and radial directions and rotatably about the axis of tire. Therefore, the camera head 17 can be driven into a given position with respect to the tire 1 in accordance with the position signal supplied from the controller 19 and is rotated by a suitable angle for scanning the tire information marks 20.

Now the operation of the apparatus of the present embodiment will be explained.

When the tire is fed on the roller conveyer 2 into the first stage 3, the tire arrival sensor 6 detects the tire 1. Then the width and inner diameter of the tire 1 are detected by the tire width and inner diameter sensors 7 and 9, respectively, and the detected width and inner diameter are supplied to the controller 15. Then the controller 15 supplies the tire size signal to the camera head driver 14 so that the first camera head 13 is the second stage 4 is driven into such a position that the side wall portion 1B of tire can be photoelectrically scanned along the circle C on which the identification mark 21 is formed.

After the width and inner diameter have been measured, the tire 1 is fed into the second stage 4 and is detected by the tire arrival sensor 11. Then the centering device 12 is driven such that the tire axis O is aligned with the given axis of the first camera head 13. Then the first camera head 13 is positioned with respect to the tire 1 in accordance with the tire size signal by means of the controller 15 and driver 14.

Figure 3:
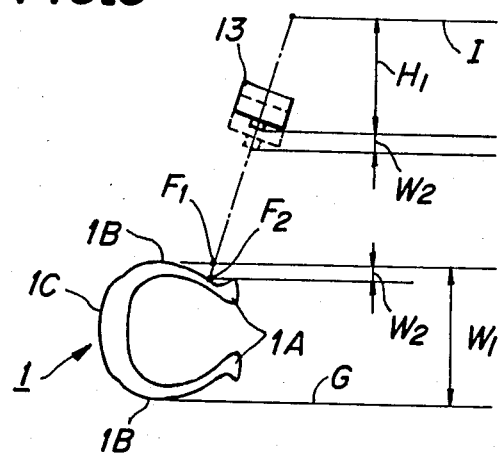
FIG. 3 is a schematic view illustrating a manner of positioning the camera head with respect to the tire.

As explained above, the camera head 13 is moved in the tire width direction in accordance with the width detected by the tire width detection sensor 7, the camera head 13 is driven into at a position below an upper reference level I by a distance $H_1$ as illustrated in FIG. 3. In this position the camera head 13 is focussed at a position $F_1$ which is apart from a lower reference level G by a distance $W_1$ equal to the detected tire width. In accordance with the shape of tire the side wall portion 1B has a curved configuration and thus a position $F_2$ on the side wall portion 1B at which the identification and tire information marks 20 and 21 are formed might be deviated from the position $F_1$ by a distance $W_2$. In order to form a sharp image of the side wall portion 1B, an objective lens of the camera head 13 must have a large focal depth or the camera head 13 must comprise an automatic focus adjusting system for moving the camera head 13 downward by the distance $W_2$ so that the camera head 13 is focussed at the position $F_2$ as illustrated by a chain line in FIG. 3. In this case, the automatic focus adjustment may be also performed by moving the objective lens in its optical axis direction. The automatic focus adjustment system may comprise a displacement detecting device arranged separately from the camera head 13.

After the camera head 13 has been positioned with respect to the tire 1, the tire is rotated about its axis so that the side wall portion 1B is optically scanned along the circle C which is separated from the rim of the bead portion 1A by the predetermined distance L. In this manner, the identification mark 21 is optically read out in a rapid and accurate manner.

Figure 4A:
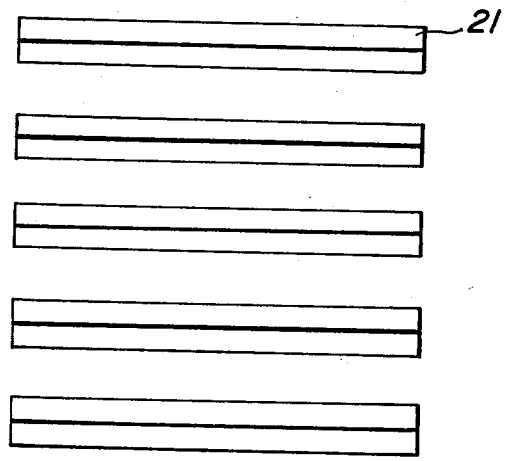
FIGS. 4A and 4B are plan and cross sectional views, respectively depicting the construction of the identification mark.
Figure 4B:
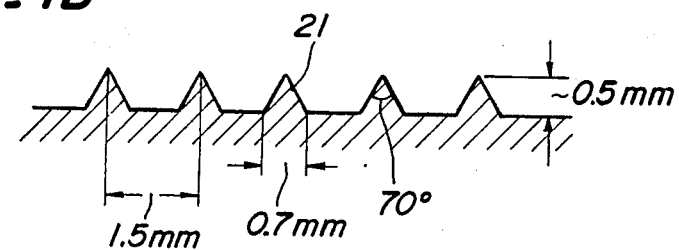
Figure 5A:
FIGS. 5A and 5B are plan and cross sectional views, respectively showing the construction of the tire information mark.
Figure 5B:
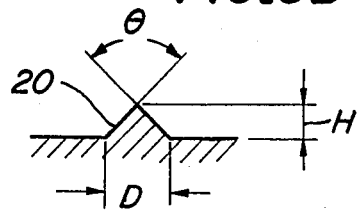

On the side wall portion 1B there are formed various characters, numerals and marks other than the identification mark 21 and these undesired marks may be noise for a signal representing the identification mark 21. According to the present embodiment, in order to increase a signal-to-noise ratio of the detected signal and to detect the identification mark 21 accurately, the identification mark 21 is formed by a bar code having five mark elements extending in the circumferential direction of the tire as shown in FIG. 4A. These mark elements are arranged side by side at a pitch of 1.5 mm and each element has a length of 6 mm, and a base width of 0.7 mm. The mark element has a cross section of triangle having an apex angle of 70° and a height of 0.5 mm as illustrated in FIG. 4B. Further, the tire information marks 20 are also constructed in a similar configuration as shown in FIGS. 5A and 5B. In this case, a base width D is preferably set to 0.4 to 1.0 mm, particularly 0.4 to 0.8 mm, a height H is set to 0.4 to 1.4 mm, particularly 0.4 to 0.8 mm, and an apex angle $\theta$ is set to 40° to 140°, preferably 55° to 110°.

Figure 6:
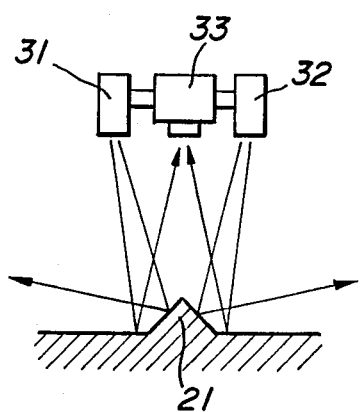
FIG. 6 is a schematic view illustrating an embodiment of the camera head according to the invention.

When the identification mark and tire information marks are formed in the manner explained above, the optical heads 13 and 17 may be preferably formed as illustrated in FIG. 6. That is to say, a pair of light projectors 31 and 32 are arranged on respective sides of a camera 33 for projecting illumination light substantially in parallel with an optical axis of the camera. Then, light rays reflected by the mark are deflected substantially horizontally and are not made incident upon the camera 33. Whereas light rays impinging upon a flat background are reflected substantially vertically and are made incident upon the camera 33. In this manner, the mark can be read out as a dark region in the bright background and thus a photoelectric signal having high S/N can be derived.

Figure 7A:
FIGS. 7A and 7B are signal wave forms of a signal representing the identification mark.
Figure 7B:
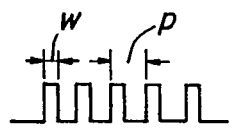

In the present embodiment, the camera head 13 for detecting the identification mark 21 comprises a line sensor having a number of light receiving elements aligned in the radial direction of tire. When the side wall portion 1B of tire is scanned by the camera head 13 along the circle C, an image signal as illustrated in FIG. 7A is obtained. The image signal is sliced by a suitable level TH to derive a bivalent signal shown in FIG. 7. When the camera head 13 is rotated at a high speed such as one revolution per second, the given number of bivalent pulses having given width w and pitch p to derive a position signal, i.e. angular position signal of the identification mark 21 can be derived. The position signal thus derived is supplied together with the data of R, $W_1$ and $W_2$ to the controller 19 to which has been previously supplied information representing a relative positional relation between the identification mark 21 and tire information marks 20. Then, the controller 19 supplies a position signal to the driver 18 and the second camera head 17 is driven into a given position suitable for detecting the tire information marks 20. After the tire 1 has been detected by the tire arrival sensor 16 in the third stage 5, the camera head 17 is operated to read out the tire information marks 20 to derive an image signal. In the present embodiment, the camera head 17 comprises a two dimensional image sensor and thus the camera head is not necessarily rotated during read out. If the tire information marks 20 are too large to be picked up by the single image sensor, there may be arranged two image sensors. The image sensor is read out at a suitable scanning frequency to derive an image signal. The image signal thus derived is converted into a bivalent signal by a circuit 22 and the converted bivalent signal is stored in an image buffer memory 23. The bivalent image signal stored in the memory 23 is read out and supplied to an image processing circuit 24 which processes the image signal in a usual manner and produces a signal for classifying the tire 1. In this case, the detected width and inner diameter of tire are also supplied to the image processing circuit 24.

In the present embodiment, the measurement of the width and inner diameter of tire at the first stage 3 can be performed rapidly without stopping the tire. The detection of the identification mark at the stage 4 can be carried out within 1.5 seconds. The tire is fed from the second stage 4 to the third stage 5 within 1.5 seconds. In the third stage 5, the detection of the tire information marks can be effected instantaneously, but the image signal processing requires about two seconds. Therefore, the apparatus can treat the tire within about five seconds. Thus, when the tire manufacturing line has the tire flow period of two to three seconds, it is sufficient to provide two sets of the apparatuses in parallel with each other.

The present invention is not limited to the embodiment explained above, but many modifications and alternations may be conceived by those skilled in the art within the scope of the invention.

For instance, in the above embodiment, the first stage for detecting the size of tire and the second stage for reading out the identification mark are arranged separately from each other. However, these stages may be constructed by a single stage as long as the detection of the tire size and the detection of the identification mark do not interact each other. In this case, it is preferable to form the identification mark by a magnetization pattern and the first camera head is replaced by a magnetic sensor.

Further, in the above embodiment, the side wall portion of tire is illuminated vertically and light rays reflected by the background are made incident upon the image sensor. However, it is also possible to illuminate the side wall portion substantially horizontally and light rays reflected by the marks may be made incident upon the image sensor.

Moreover, in the above embodiment, the camera head of the third stage for detecting the tire information marks comprises the two dimensional image sensor. But the camera head may be constituted by a linear image sensor. In such a case, the camera head has to be rotated at a constant speed to scan the tire identification marks.

What is claimed is:

1. An apparatus for optically detecting tire information marks formed on a side wall portion of tire in the form of a protrusion or recess, comprising
   first detecting means for detecting width and inner diameter of tire to derive a tire size signal;
   second detecting means comprising a detector head for detecting an identification mark provided on the side wall portion of tire separately from the tire information marks, and means for positioning said detector head in accordance with the tire size signal and for rotating relatively the detector and tire to derive a position signal representing both circumferential and radial positions of the information marks; and
   third detecting means comprising a camera head for picking up the tire information marks and, means for positioning the camera head in accordance with the position signal.

2. An apparatus according to claim 1, further comprising means for feeding the tire along a path along which said first, second and third detecting means are arranged in this order.

3. An apparatus according to claim 1 wherein said camera head of the second detecting means comprises a linear image sensor having a plurality of light receiving elements aligned in the radial direction of the tire.

4. An apparatus according to claim 1, wherein said camera head of the third detecting means comprises a two dimensional image sensor which picks up an image of the tire information marks, while the camera head and tire are not relatively moved.

5. An apparatus according to claim 1, wherein said detector head of the second detecting means is formed by a camera head for optically picking up the identification mark which is engraved in the side wall portion of tire in the form of protrusion or recess.

6. An apparatus according to claim 5 wherein said camera head of the second detecting means is arranged movably in width and radial directions of the tire and rotatable about an axis.

7. An apparatus according to claim 6, wherein said second detecting means further comprising means for positioning the tire with respect to the camera head such that a tire axis is aligned with said axis about which the camera head is rotatable.

8. A tire for use in a vehicle comprising; a main body including head portion, side wall portion and tread portion, tire information marks engraved in the side wall portion in the form of a protrusion of a recess, and an identification mark engraved in the side wall portion in the form of a protrusion or a recess separated from the tire information marks, said identification mark being formed by a bar code having a plurality of elongated elements which are extended in a circumferential direction of the tire and are aligned in the radial direction of the tire, whereby said identification mark and said tire information marks are provided on the same circle.

9. A tire according to claim 8 wherein said identification and tire information marks are formed by protrusions having a triangular cross section whose apex angle is set to 40°–140°, preferably 55°–110°, whose height is set to 0.4–1.4 mm, preferably 0.4–0.8 mm, and whose base width is set to 0.4–1.0 mm, preferably 0.4–0.8 mm.

10. A method of detecting tire information marks provided on a side wall portions of tire in the form of a protrusion or a recess comprising the steps of:
    detecting an identification mark provided on the side wall portion of tire separately from the tire information marks, at a fist detecting stage with the aid of a first detector head to derive a position signal representing both circumferential and radial directions of the information marks;
    transporting the tire from said first detecting position into a second detecting position, while the attitude of the tire is kept substantially unchanged;
    positioning at least in circumferential and radial directions of the tire a second detector head provided at the second detecting position in accordance with said position signal; and
    detecting the tire information marks with the aid of said detector head.

11. A method according to claim 10 wherein prior to the detection of the identification mark, width and inner diameter of tire are detected to derive a tire size signal, and said first detector head for detecting the identification mark is positioned with respect to the tire in accordance with the detected tire size signal.

12. A method according to claim 11, wherein said identification mark is formed by a bar code mark consisting of a plurality of elongated elements which are extended in the circumferential direction of tire and are aligned in the radial direction of tire, and the identification mark is optically detected by the second head comprising a linear image sensor including a plurality of light receiving elements aligned in the radial direction of tire.

13. A method according to claim 11, wherein said second detector head is positioned also in a direction substantially perpendicular to said circumferential and radial directions in accordance with said tire size signal.

14. A tire according to claim 8, wherein said identification mark is formed by an odd number of elongated elements which have substantially same length in the circumferential direction of tire.

15. A number according to claim 14, wherein said odd number of elongated elements are separated substantially equidistantly from each other in the radial direction of tire.

16. A method according to claim 10 wherein said tire information marks are engraved in the side wall portion of tire in the form of a protrusion a or recess, and the tire information marks are optically detected by the second detector head including an image sensor.

17. A method according to claim 16 wherein said indentification mark is engraved in the side wall portion of tire in the form of a protrusion or recess, and the identification mark is optically detected by the first detector head including an image sensor.

* * * * *